United States Patent [19]

Haden et al.

[11] Patent Number: 4,812,623
[45] Date of Patent: Mar. 14, 1989

[54] ELECTRICAL APPARATUS

[75] Inventors: John D. Haden, Rugeley; Eric Duxbury, Walsall, both of England

[73] Assignee: D. H. Haden Limited, Walsall, England

[21] Appl. No.: 76,332

[22] Filed: Jul. 22, 1987

Related U.S. Application Data

[63] Continuation-in-part of Ser. No. 819,148, Jan. 15, 1986, Pat. No. 4,707,042.

[30] Foreign Application Priority Data

| Feb. 5, 1985 | [GB] | United Kingdom | 8502909 |
| Aug. 3, 1985 | [GB] | United Kingdom | 8519552 |
| Jul. 24, 1986 | [GB] | United Kingdom | 8618132 |

[51] Int. Cl.⁴ .............................................. F27D 11/00
[52] U.S. Cl. ..................................... 219/437; 219/328; 439/140
[58] Field of Search ............... 439/137, 145; 219/437, 219/328, 441, 435

[56] References Cited

U.S. PATENT DOCUMENTS

| 4,358,666 | 11/1982 | Taylor | 219/441 X |
| 4,399,351 | 8/1983 | Koff | 219/435 X |
| 4,418,270 | 11/1983 | Inskip et al. | 219/441 X |
| 4,517,445 | 5/1985 | Tatsumi et al. | 219/441 X |
| 4,544,830 | 10/1985 | Miller | 219/437 X |
| 4,621,186 | 11/1986 | Taylor et al. | 219/437 X |
| 4,707,042 | 11/1987 | Haden | 439/140 |

Primary Examiner—E. A. Goldberg
Assistant Examiner—M. M. Lateef
Attorney, Agent, or Firm—Becker & Becker, Inc.

[57] ABSTRACT

An arrangement including an appliance and an optional support. The electrical appliance has a vessel; an electrical device is mounted centrally on the bottom of the vessel together with an electrical control so as to be protected in a hollow base below the bottom. Mechanical actuator mechanism extends from the base to a position convenient for manual actuation. The base may be stood on the support so that electrical terminal pins engage in electrical supply sockets in the support, and the support may incorporate a supply switch to isolate the sockets when the appliance is lifted.

28 Claims, 6 Drawing Sheets

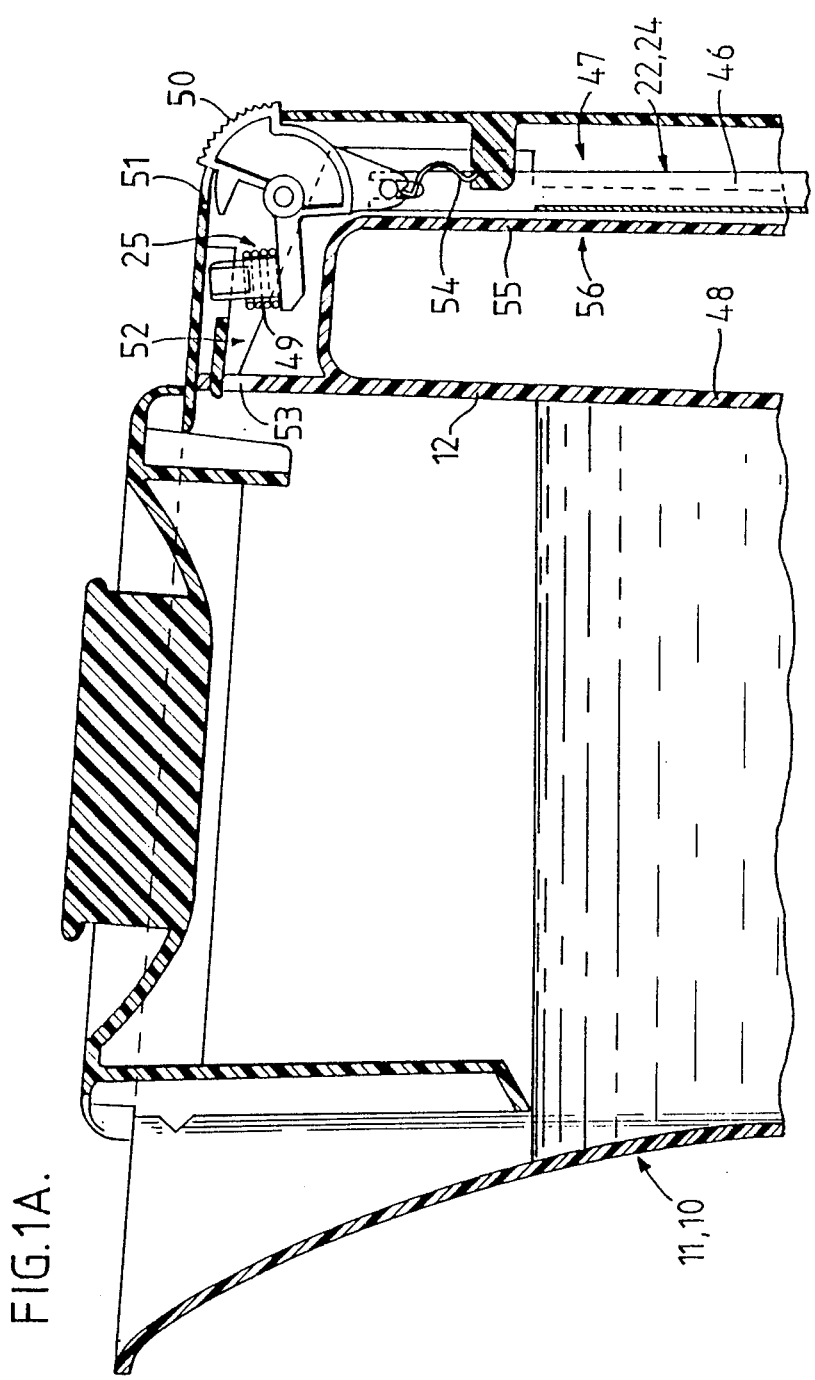

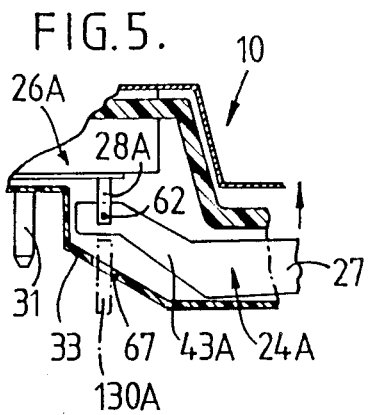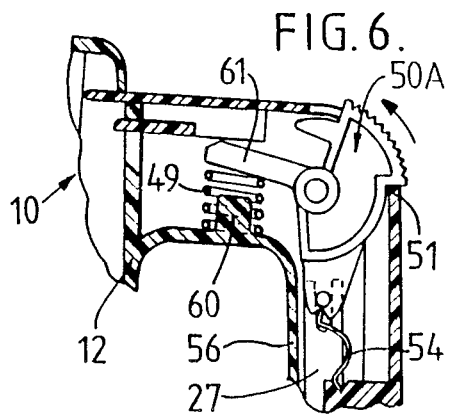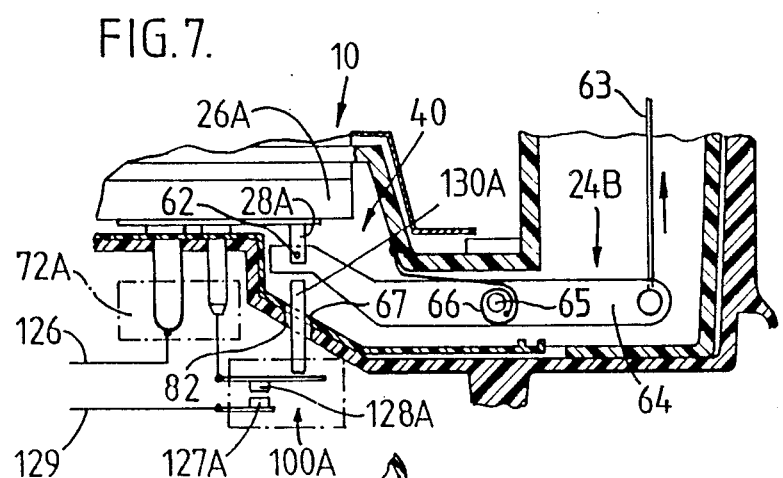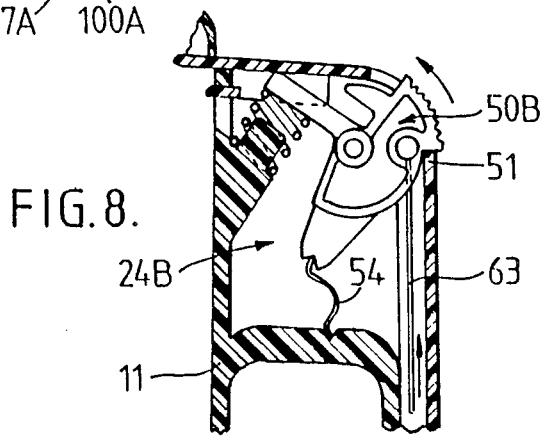

ELECTRICAL APPARATUS

This is a continuation in part of our copending U.S. application Ser. No. 819148 Haden filed Jan. 15, 1986, now U.S. Pat. No. 4,707,042-Haden issued Nov. 17, 1987 and belonging to the assignee of the present invention.

BACKGROUND OF THE INVENTION

This invention concerns electrical appliances, appliance support apparatus amd other forms of electrical apparatus.

There are many known forms of electrical apparatus which incorporate vessels to hold a material such as a liquid, a solid or a mixture thereof for processing, e.g. heating, mixing or grinding, by an electrical device incorporated in the apparatus.

In some forms of such apparatus, such as coffee pot warmers, the vessel rests on and is removable from a base part of the apparatus, which base part incorporates the electrical device and all control means necessary for controlling the device. Such vessels can be designed freely for convenience and safety of handling, visual appeal, and low cost manufacture. However, in other forms of apparatus, such as electric kettles the vessel and electrical device are combined and inseparable, so that the design of such apparatus is restricted by problems including the need to suitably accommodate the electrical device, the necessary control means and the electrical connectors, and to provide for satisfactory and safe electrical operation of the apparatus.

Attempts to solve the problem of electrical safety have resulted in further problems of inconvenience to the user, excessive cost and complexity of manufacture, excessive bulk of the apparatus, and vulnerability of the electrical device and/or electrical parts of the control means to impact damage.

An object of the invention is to enable at least some of said problems to be avoided or reduced.

SUMMARY OF THE INVENTION

According to the present invention there is generally provided electrical apparatus comprising a vessel, an electrical device in a lower portion of the vessel a control means to control said device; wherein the vessel comprises and interior bounded by a bottom and a wall extending upwards from said bottom, and an actuation space which is external to said interior and which extends inwardly to below said bottom; wherein said control means comprises electrical switch means actuable from below said botom to close an electrical supply connection to the electrical device, and a non-electrical manually actuable mechanism; wherein said manually actuable mechanism comprises a part exposed for manual displacement, and extends inwardly in said space below said bottom to actuate said switch means; and wherein the switch means and electrical device are connected together to form an assembly secured to said bottom.

According to the present invention there is further provided electrical apparatus of a kind comprising a vessel, an electrical device and control means to control said device; the vessel comprising an interior bounded by a bottom and a wall extending upwards from said bottom, and an actuation space which is external to said interior and which extends upwardly at least partially alongside said wall; and said control means comprising switch means actuable, by a non-electrical manually actuable mechanism, to close an electrical supply connection to the electrical device; the apparatus of the invention being characterized in that;
(a) said electrical device is supported by said bottom,
(b) said switch means is actuable from below said bottom, and
(c) said manually actuable mechanism extends upwardly in said actuation space to a part exposed for manual displacement, and extends inwardly from said space to below said bottom to actuate said switch means.

The mass of the electrical components is thus centralized in a lower part of the apparatus and can be protected and concealed by a base skirt and, optionally, a detachable base member of the apparatus, so that the vessel can be made very pleasant to handle, attractive in appearance, electrically safe and very convenient to operate.

There is disclosed in our British patent application No. 8600087, published on 6 Aug. 1986under No. GB2170662A (whichis equivalent to U.S. Pat. No. 819148 Haden filed Jan. 15, 1986 and now U.S. Pat. No. 4,707,042- Haden issued Nov. 11, 1987 and belonging to the assignee of the present invention), electrical socket apparatus, for example, for safely supporting and supplying electricity to an electrical appliance provided with at least live and neutral terminal pins; the apparatus including locating means engageable by the appliance to locate the appliance in a predetermined position; sockets to receive respective pins; and electrical conductors in each socket; switch means actuable by the appliance being placed in said predetermined position to make an electrical connection to at least one of said electrical conductors; and a displaceable member which projects into said sockets and is movable against a bias to actuate said switch means, to prevent risks, e.g. electric shocks and overheating of contacts, and to hinder misuse of the apparatus. The switch means may alternatively be actuated by a toggle mechanism. A shutter is pivoted by an earth or grounding pin of the appliance so as to uncover the live and neutral sockets.

The present invention, and said apparatus of the invention, is particularly suited for use in conjunction with such socket apparatus.

Accordingly, the invention further generally provides electrical apparatus comprising an appliance and support apparatus; the appliance comprising a vessel having electrical connectors in a hollow base thereof to engage electrical connector means in the support apparatus, when the appliance is supported upon the support apparatus in a predetermined position, for supplying electrical power to an electrical device of the appliance via the support apparatus; wherein a manually actuable mechanism extends, from a part exposed for manual displacement, inwardly in a hollow base of the appliance, for actuating electrical switch means of the electrical apparatus for electrically controlling said device.

The support apparatus is preferably arranged so that the weight of the appliance can be utilized to hold the electrical connectors in sockets, provided by the connector means, against ejection forces tending to eject the connectors from the sockets.

The switch means may be part of the appliance and-/or part of the support apparatus.

The present invention further provides electrical apparatus comprising an appliance and support apparatus; the appliance having electrical connectors in a base thereof to engage electrical connector means in the support apparatus, when the appliance is supported upon the support apparatus in a predetermined position, for supplying electrical power to the appliance via the support appliance; wherein the appliance comprises a vessel and an electrical immersion heater secured through a raised portion of a bottom of a vessel; and wherein an electrically heatable portion of said heater extends in a trough in said bottom below the level of said raised portion.

Said vessel may be a molding of plastics material; and a metal heat shield may be clamped by said heater to said raised portion, and shaped to extend into the trough to below the heatable portion.

BRIEF DESCRIPTION OF THE DRAWINGS

The invention will be described further by way of example with reference to the accompanying diagrammatic drawings, wherein:-

FIGS. 1A and 1B are views that show apparatus of the invention, in vertical cross-section;

FIGS. 5 to 11 are view that show details of modified forms of the apparatus.

DESCRIPTION OF PREFERRED EMBODIMENTS

Figure 1B:
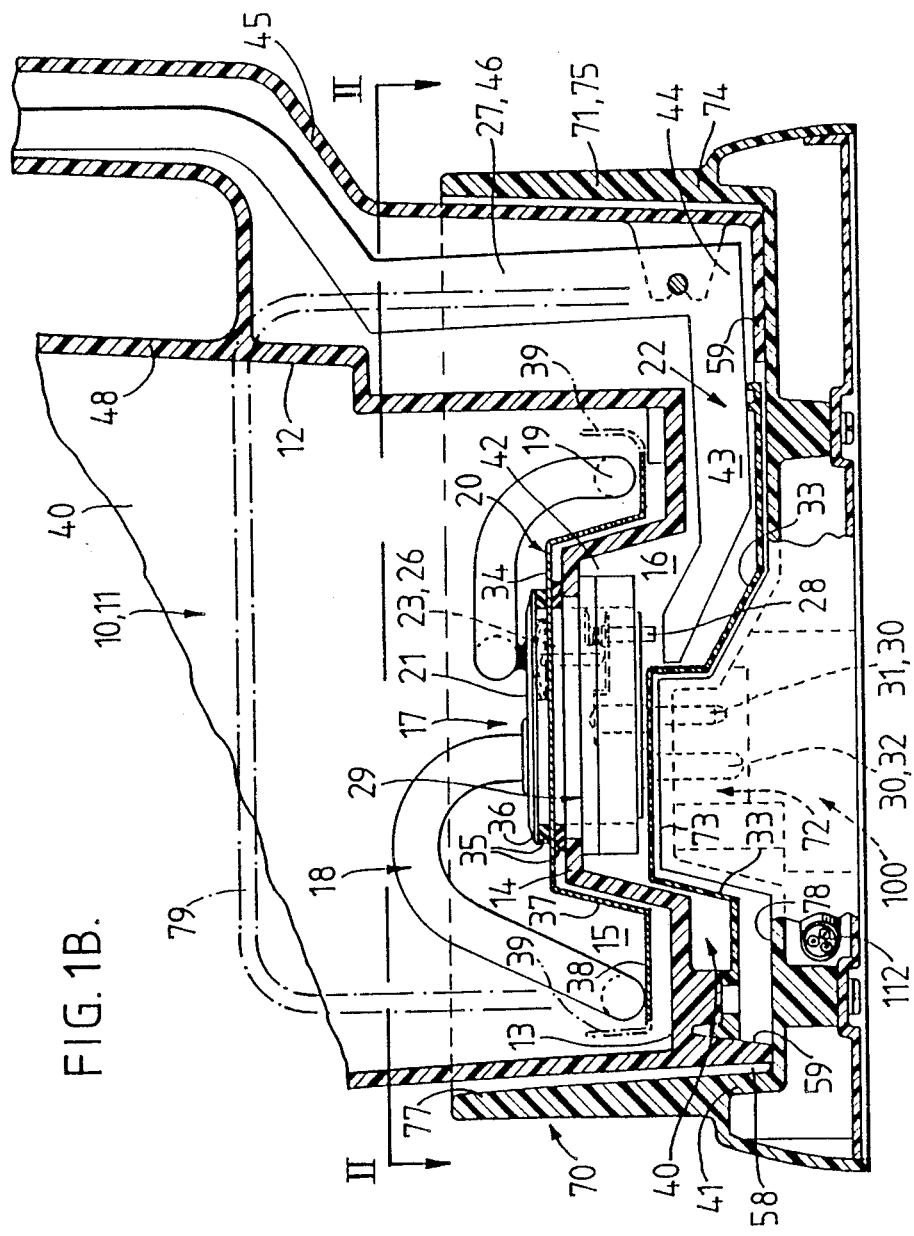

The electrical apparatus comprises an appliance 10 and, in most embodiments, support apparatus 70.

The appliance, in this embodiment, is a water boiling vessel 10 having a hollow molded plastics body 11 the interior of which is bounded by a wall 12 upstanding from an internal bottom 13. The bottom 13 has a raised central portion 14 to provide an annular trough 15 around the central portion 14 and a downwardly open recess 16 below the central portion 14.

The vessel has an electrical device 17 in the form of an immersion heater 18 which is secured to and extends through the portion 14 so that a heating portion 19 of the heater is suspended in the trough above a metal heat shield 20 clamped in place by a head 21 of the heater.

The apparatus 10 is provided with control means 22 which, in this embodiment, comprises electrical switch means 23, non-electrical manually actuable mechanism 24, and a steam responsive mechanism 25, all provided on the vessel.

The switch means 23 is mounted in the head 21 and comprises a switch 26 which responds, to switch off the heater, upon overheating of the head 21 and upon a control lever 27 of the mechanism 24 being moved from the position shown to push a projecting switch actuating member 28 upwards. The heater 18 and switch means 23 are assembled together to form an assembly 29 mounted on the bottom, the assembly 29 is provided with electrical connectors 30 comprising pins 31 and 32, which pins project downward, through a detachable base member 33 of the vessel.

The metal heat shield member 20 has an apertured upper portion 34 sandwiched between seals 35 which are interposed between a flange 36 of the head 21 and the central portion 14; has a frusto-conical intermediate portion 37; and has, at the bottom of the portion 37, an outer lower portion 38. The latter may have a peripheral upstanding wall part 39 (shown in broader lines) between the wall 12 of the body and the portion 19 of the heater, so that the member 20 serves as a suspended liner for the trough 15, which liner is spaced apart from the body surfaces defining the trough, except possibly for contact therewith at the brim of the wall part 39.

The vessel 10 has a hollow base 40, below said bottom 13, within a peripheral base skirt 41; and said base member 33 serves as a partition or closure to leave a space 42 between the bottom 13 and the base member 33 to house the switch means 23 and a lower part or arm 43 of the contact lever 27. The lower part 43 extends outwardly, within the hollow base 40, from below said actuating member 28 to an elbow 44 pivotally-mounted on a cover member releasably connected to the body 11. An upstanding part 46 of the control lever extends upwardly from the elbow 44, within an actuation space 47 which is external of the interior of the vessel 10 and which extends upwardly within a side part 48 of the vessel. The steam responsive mechanism 25 is provided in an upper part of the actuation space 47, and comprises a heat sensitive member 49 of known form which changes shape when exposed to steam to rotate a part 50, which is exposed for manual operation, counterclockwise about a pivotal axis from an "on" position, in which said part is shown in FIGS. 1A and 1B, to an "off" position in which the part 50 abuts a stop 51.

The portion of the actuation space 47 around the heat sensitive member 49 constitutes a steam space 52 which is connected to the interior by passage means 53 comprising a steam vent adjacent the top of the wall 12 to direct steam from the interior onto said member 49. The part 50 is connected to the upper end of the upstanding part 46 to entrain the mechanisms 24 and 25 to move in unison, and the mechanisms are biased by an over center spring 54 so as to be stable only in said "on" and "off" positions.

The side part 48 of the vessel comprises the removable side cover member 45, which carries said mechanisms 24 and 25, a portion of the wall 12, and an extension 55 of said body 11, which extension 55 serves as part of a hollow handle 56 of the vessel 10.

The support apparatus 70 is provided with locating means 71, which locating means serves to guide the appliance 10 as it is lowered to engage the pins 31, 32 in electrical connector means 72 of a power supply switch 100 provided below a raised and apertured central part 73 of a body 74 of the support apparatus, and serves to restrain the appliance 10 against being toppled from the support apparatus 70. The apparatus 70 is further provided with holding means 80 to hold the apparatus upon a surface of an article such as a worktop or table. The power supply switch 100 is generally of a kind disclosed in our copending application Ser. No. 819,148 Haden filed Jan. 15, 1986 and now U.S. Pat. No. 4,707,042-Haden issued Nov. 17, 1987 for an Electric Socket Apparatus, which is arranged to be actuated by said pins 31, 32 being inserted into the connector means 72 so as to be held in an "on" condition by the presence of the appliance 10 in said position on the support apparatus 70.

Figure 2:
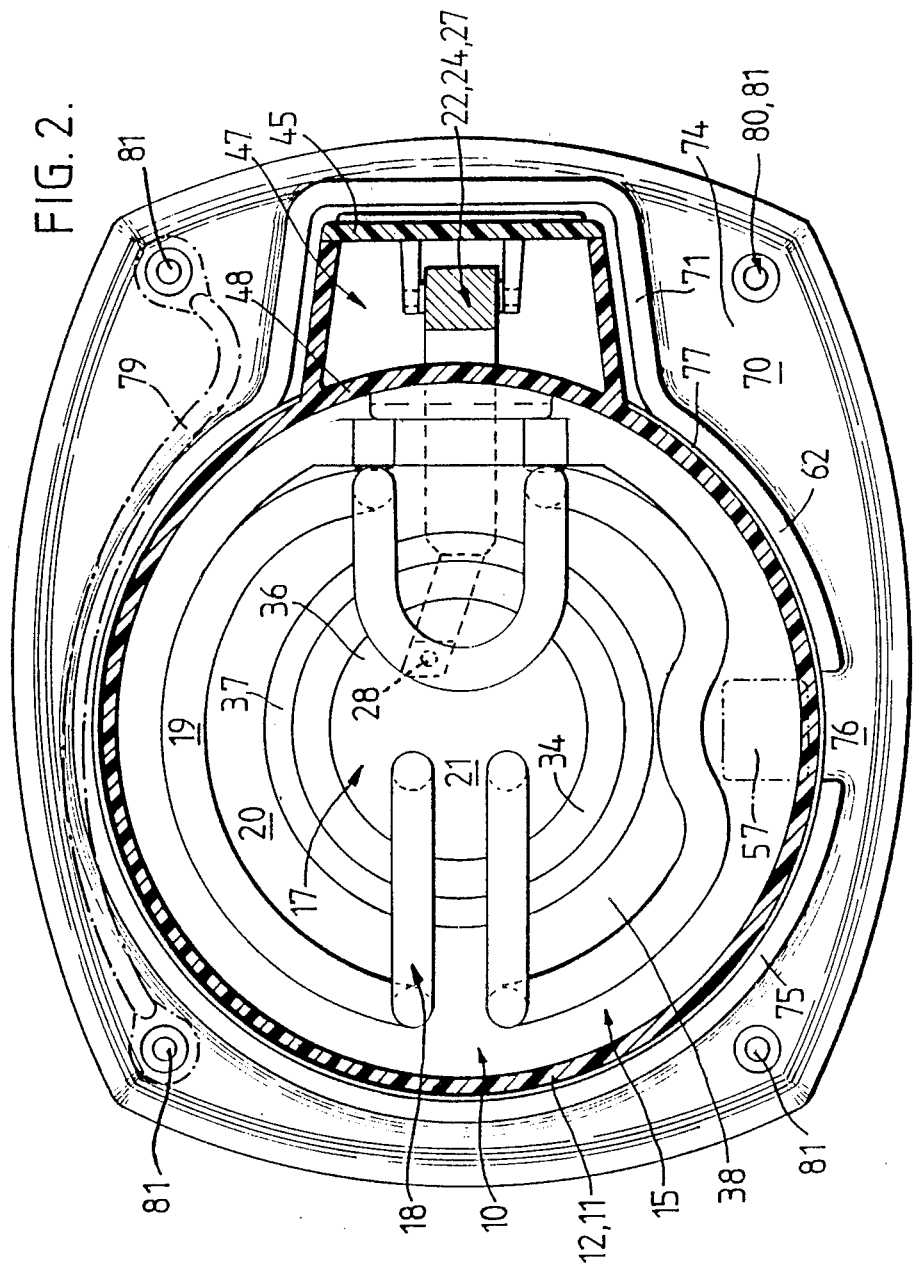
FIG. 2 is a view that shows a transverse section of the line II—II.

The locating means 71 comprises an upstanding peripheral wall 75 of the body 74, which wall 75 may be interrupted at 76 to expose an optional water lever indicator 57 set in the side of the vessel 10 as indicatedd in broken lines in FIG. 2, and which wall provides an internal guide surface 77 which co-operates with lower portions of a peripheral surface 58 of the vessel. The body 74 also provides an internal floor 78 on which rest base portions 59 of the vessel 10. The vertical extent of the surface 77 is sufficient to prevent the vessel being toppled from the body 74, e.g. it extends upwardly for about 6 cm to co-operate with about 25% of the vertical extent of the surface 58. However, if required, the locating means 71 may comprise supplementary locating means in the form of one or more upstanding devices 79 secured to the body 74 to engage the vessel a few centimeters, e.g. upto ten centimeters, above the wall 75 in the event of the vessel being tilted by more than a few degrees, e.g. 5°, relative to the body 74. One, of a pair of such devices arranged to extend around more that 50% of the periphery of the vessel, is indicated in broken lines in FIGS. 1A and 2 and is provided by an inverted U-shaped metal bar device 79, which can be held to the body 74 by fasteners (not shown), inserted through apertures 81 of the holding means 80, to secure the support apparatus to a surface of an article such as a shelf or worktop.

Figure 3:
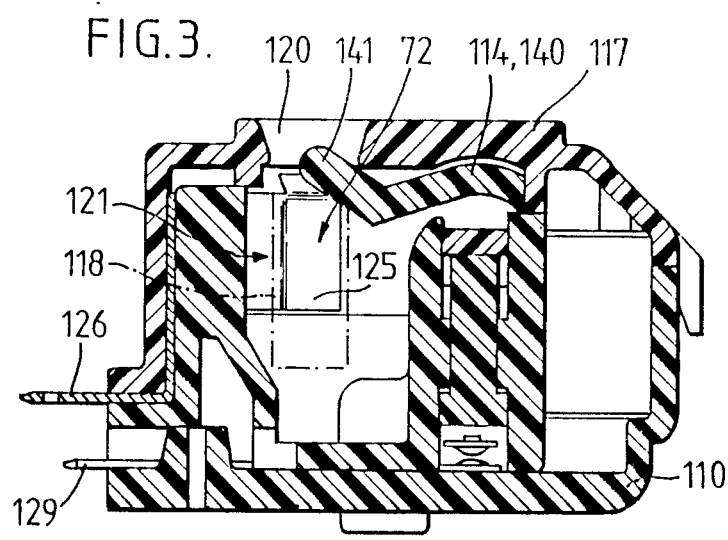
FIGS. 3 and 4 show a power supply switch of the apparatus.
Figure 4:
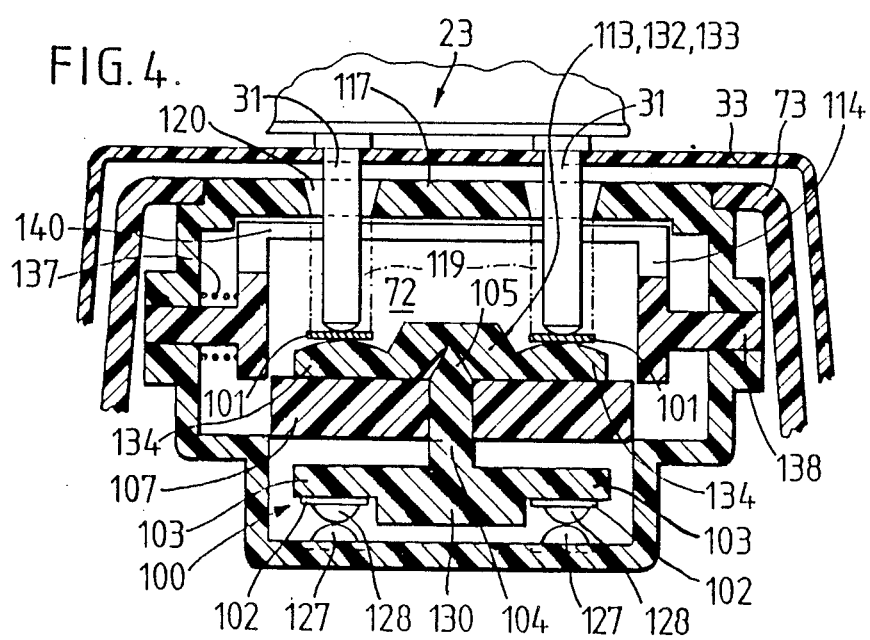

The power supply switch 100, as shown in FIGS. 3 and 4, incorporates the connector means 72 and has a body 110 that provides an earth or grounding socket 118 and live and neutral sockets 119, indicated in broken lines, which sockets extend downwardly from openings 120 in a top part 117, each socket being a space within the body 110, open to the interior 121 of the body 110, to accommodate the respective live pin 31, earth pin 32 or neutral pin 31 of the electrical device.

The body 110 supports an earth or grounding conductor 125 and live and neutral conductors 124. The earth or grounding conductor 125 extends into the socket 118, for embracing the earth or grounding pin, and has an input terminal 126. The live and neutral conductors 124 are each of U-shape having an upper leaf spring part 101 which extends across the respective socket 119, and a lower leaf spring part 102 which carries a movable contact 128 of the switch 100. The body 110 supports two fixed contacts 127 of the switch 100, and each fixed contact is connected to a respective input terminal 129 for connection to an electricity supply via a main power supply lead cable 112 of the apparatus.

The switch 100 has an actuating member 130 slidably mounted by a partition 107 to the body. The member 130 is of T-shape of provide oppositely directed arms 103 resting on the parts 102, and a central stem 104 which projects forwards through the partition 107 to provide a fulcrum 105.

A displaceable member 113 comprises a balance member or beam 132 which has a central portion 133 between portions 134 which project across the sockets 119 behind the parts 101 which rest on the portions or arms 134. The portion 133 rests on the fulcrum 105 so that the member 113 is urged to a normal position by a bias provided by the parts 102. In the normal position, the beam 132 is held spaced apart from a base provided by the partition 107 at the rear of each of the live and neutral sockets 119.

A shutter 114 is pivotally supported by the body 110 and is biased, by a shutter spring 137, to a normal position, in which a body 140 of the shutter is disposed between the openings 120 and the live and neutral conductors so as to occupy and block front portions of the live and neutral sockets 119, and in which normal position an arm 141 of the shutter extends into the earth or grounding socket 118. The shutter 114 is supported at each end by trunnions 138 so as to be arcuately movable about an axis passing through the live and neutral sockets.

The socket apparatus is arranged so that as the vessel is lowered towards the opening 120 (to cause the earth or grounding pin 32 to enter the earth or grounding socket 118 to make contact with and be gripped by the earth or grounding conductor 125), entry of the live and neutral pins 31 into the live and neutral sockets is at first obstructed by the body 140 until the earth or grounding pin has moved the arm 141 to swing the body 140 from the live and neutral sockets 119.

Further movement of the pins 31, 32 into the sockets causes the ends of the live and neutral pins 31 to make contact with the live and neutral conductors, while the switch remains open so that the live and neutral conductors are not energized; and further rearwards movement causes the live and neutral pins to bend the parts 101 to move the beam 132 rearwards against the bias, thereby causing the arms 103 to bend the parts 102 rearwards to force both of the movable contacts 128 against the respective fixed contacts 127 thereby closing the switch 100.

The invention is not confined to details of the foregoing example, and many variations are possible within the scope of the invention as defined by the appended claims. For example, the power supply switch may be of any suitable form, or may be omitted to leave only an electrical connector device in the support apparatus; and the lever 27 may be arranged to actuate the power supply switch by means of a power switch actuating member provided in or on the raised central part 73 of the support apparatus.

The lever 27 may be arranged to actuate the power supply switch by means of a power switch actuating member provided in or on the raised central part 73 of the support apparatus.

Some of these and other modifications are illustrated in FIGS. 5 to 11, in which FIGURES reference numbers already appearing in FIGS. 1 to 4 are used to indicate those parts which are common, whereas reference numbers with a suffix letter A, B or C are used in respect of modified parts, and all such parts are not re-described, for the sake of brevity.

Referring to FIGS. 5 and 6, the appliance 10 has a modified manually actuable mechanism 24A in which the "on/off" motion of the lever 27 is reversed, by mounting the heat sensitive member 49 on a post 60 on the handle 56, so as to thrust an arm 61 on the part 50A upwards to the "off" position in which the mechanism 24A is shown in these FIGURES; the lower limb 43A and acutating member 28A are modified so as to be connected by a connector 62; and the switch 26A is arranged so as to be closed by a downwards instead of upwards movement of the member 28A.

Referring to FIGS. 7 and 8, the appliance 10 again has a manually actuable mechanism 24B and switch 26A in which the "on/off" motions are reversed, but in this embodiment the part 50B is connected by a mechanical tension cable or cord 63 to a short lever 64 which extends inwards in the hollow base 40 to a connector 62. The lever 64 is pivotally mounted on the body 11 by a pivot 65 intermediate its ends, and a bias spring 66 acts on the lever 64 to keep the cord 63 in tension and to provide the thrust necessary to actuate the switch 26A.

The support apparatus 70 may have an alternate form of power supply switch 100A to supply power to separate socket connector means 72A, which switch includes an actuating member 130A which extends upwards (from contacts 128A) through apertures 82 and 67 in the part 73 and the base member 33 respectively, so as to be movable by the lever 64 (or the arm or part 43A of the modified mechanism shown in FIG. 5).

In the forms of the electrical apparatus in which the control means is arranged to actuate the power supply switch in the support apparatus, the switch 26 may be modified so as to omit the actuating member 28 or 28A; or the switch 26 may be omitted and the electrical device connected directly to the terminal pins, and the device, preferably incorporating a protective cut-out mechanism either to interrupt a connection between the element and the pins, or to mechanically displace an actuation member, substituted for the member 28 or 28A to actuate the actuating member 130A, e.g. via the lever or part 64 or 43A, by displacing the latter to the "off" position.

Furthermore, the appliance may, with no or minimal modification, be employed without the support apparatus, by securing a main power supply electrical lead to terminal connectors of suitable form, or by providing a main power supply lead with socket connector means to receive the pins 31 and 32.

Figure 9:
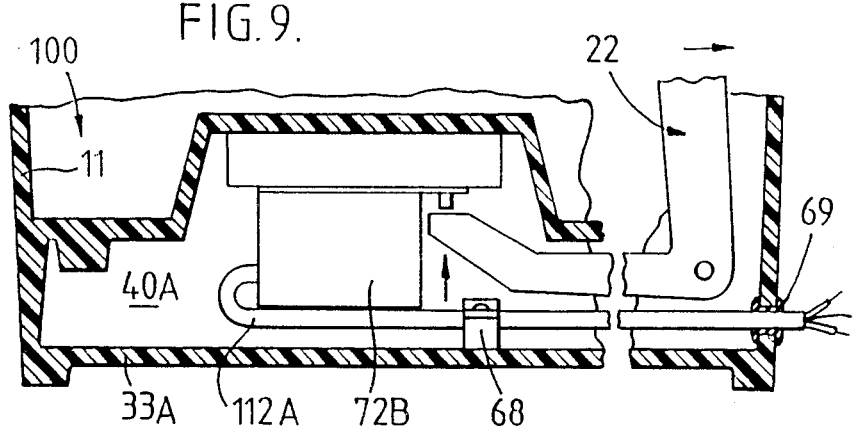

Referring to FIG. 9, the appliance is provided with a modified base member 33A provided with socket connector means 72B and clamp means 68 to hold a main power supply lead 112A which runs within the hollow base 40A to a grommet protected exit 69. The means 72b is arranged so that it is detached from the pins only when the member 33A is detached, but an equivalent connector means could be releasably connected below the base member 33 of the previous embodiments.

The steam responsive mechanism 25 could be omitted, and in such forms of appliance the control means 22 may be operated manually by a part exposed at any suitable location on the appliance.

Figure 10:
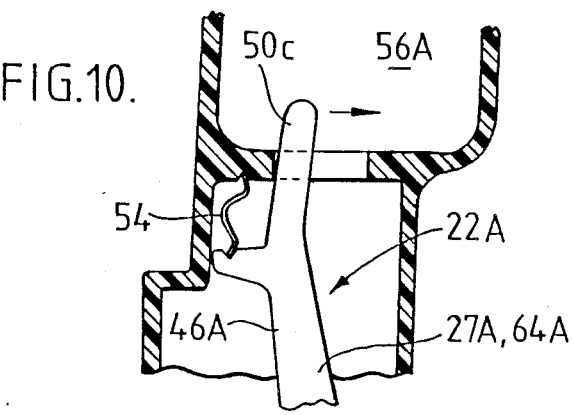
Figure 11:
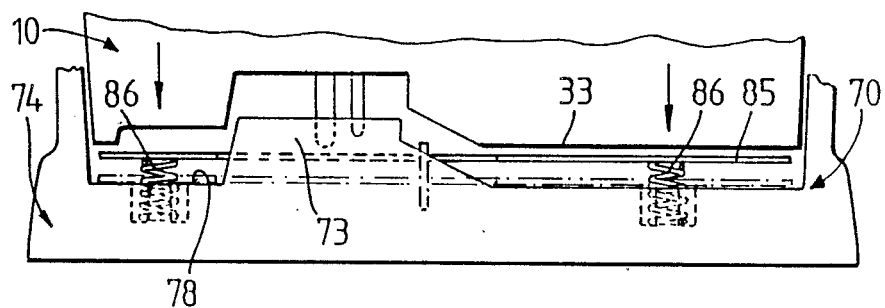

Referring to FIG. 10, the appliance has modified control means 22A in which the control lever 27A or 64A has a short upstanding part 46A which provides the manually actuable part 50C at its upper end to extend upwards into the handle void 56A; and the over-center spring 54 is arranged to act directly on the lever 27A or 64A.

The apparatus is inherently suitable for use with other safety means, for example, load sensitive means (FIG. 11), to ensure that power is not supplied to the appliance when empty. The load sensitive means comprises a platform 85 which is supported by springs 86 and is located around the control part 73 and above the floor 78 of the support apparatus 70. The springs 86 are arranged so that:-

(a) when the vessel 10 contains less than a predetermined quantity (e.g. half a pint or one third of a liter) of water, the platform is held clear of the floor 78 to prevent the power supply switch 100 or 100A being actuated; and (b) when the vessel contains more than said quantity of water, the platform is depressed, e.g. to contact the floor 78, sufficiently to permit actuation of the switch 100 or 100A.

The appliance may be of other forms, e.g. a coffee maker, cooking utensil, warming dish, kettle, mixer, blender, grinder, incubator or like laboratory, household or kitchen appliance incorporating a vessel, particularly an appliance which may be utilized in a particular location to perform a power consuming operation and which is taken thereafter to another location to be used or for the contents therein to be extracted, used, examined or consumed, and has the further advantage that the or at least a manually operable part of the control means can be conveniently situated in, on or adjacent a handle of the vessel, and electrically and spatially remote from the well protected electrical device and other electrical parts of the apparatus.

The present invention is, of course, in no way restricted to the specific disclosure of the specification and drawings, but also encompasses any modifications within the scope of the appended claims.

Having thus set forth and disclosed the nature of this invention, what is claimed is:

1. An electrical apparatus having electrical components centralized in a lower part of the apparatus for a lower center of gravity to improve stability as well as for protection against spilling of contents and concealment by a base skirt to assure attractive appearance, electrical safety and convenient operation for water boiling, for processing of a liquid, solid as well as a mixture thereof by heating, mixing or grinding, primarily concerning water boiling in an arrangement which physically incorporates a mechanism responsive to production of steam using substantially identical parts and manufacturing procedures with the only difference being with respect to cordless and cord-attached configurations comprising:

a vessel having a lower portion, an interior that is bounded by a bottom in said lower portion and a wall which extends upwardly from said bottom, and an actuation space that is disposed externally of said interior and extends upwardly at least partially along said wall, and inwardly to below said bottom;

an electrical device disposed in said lower portion and supported by said bottom, said electrical device being connectable to a supply of electricity; and control means for controlling said electrical device, said control means including: electrical switch means that communicates with said actuation space and is actuable from below said bottom for controlling communication of said electrical device with said supply of electricity; and a non-electrical, manually actuable mechanism that includes a part that is exposed for manual displacement, and extends downwardly in said actuation space from said part and inwardly in said actuation space to below said bottom for actuation of said electrial switch means.

2. An apparatus according to claim 1, in which said manually actuable mechanism includes a tension cord.

3. An apparatus according to claim 1, in which said manually actuable mechanism includes a pivot means that supports a lever having a first arm which extends upwardly to said part, and a second arm which extends inwardly to said switch means.

4. An apparatus according to claim 1, in which said switch means and said electrical device are connected together to form an assembly that is secured to said bottom.

5. An apparatus according to claim 4, in which said lower vessel portion includes a hollow base above which said vessel bottom is disposed, with electrical connector means being disposed in said follow base for releasable connection of said electrical device and said switch means to a power supply lead.

6. An apparatus according to claim 1, in which said vessel bottom has a raised central portion surronded by a trough within said interior of said vessel; and in which said electrical device is an electrical immersion heater that extends through said raised central portion and has an electrically heatable portion which extends in said trough.

7. An apparatus according to claim 6, which includes a steam responsive mechanism disposed at an upper end of said actuation space and operatively associated with said part, with said vessel wall including passage means for connecting said interior and said actuation space to permit steam generated in said interior to be directed to said steam responsive mechanism.

8. An apparatus according to claim 6, in which said vessel is a molded plastic member; and which includes a metal heat shield that is clamped to said raised central portion by said heater, and is shaped in such a way that it extends into said trough to below said heatable portion.

9. An electrical apparatus that includes an appliance, control means to control said appliance so that weight of the appliance can be utilized to hold electrical connectors in sockets, provided by the connector means against ejection forces tending to eject the connectors from the sockets, and support apparatus to support said appliance, with said support apparatus having locating means for locating said appliance in a predetermined position, and electrical means for connecting said appliance to a supply of electricity, said apparatus having electrical components centralized in a lower part of the apparatus for a lower center of gravity to improve stability as well as for protection against spilling of contents and concealment by a base skirt to assure attractive appearance, electrical safety and convenient operation for water boiling, for processing of a liquid, solid as well as a mixture thereof by heating, mixing or grinding, primarily concerning water boiling in an arrangement which physically incorporates a mechanism responsive to production of steam using substantially identical parts and manufacturing procedures with the only difference being with respect to cordless and cord-attached configurations comprising:
an appliance in the form of a vessel having a lower portion, an interior that is bounded by a bottom in said lower portion and a wall which extends upwardly from said bottom, and an actuation space that is disposed externally of said interior and extends upwardly at least partially along said wall, and inwardly to below said bottom;
an electrical device disposed in said lower portion and supported by said bottom; and
control means that includes: electrical switch means that communicates with said actuation space and is actuable from below said bottom for controlling the supply of electricity, via said connector means, to said electrical device; and a non-electrical, manually actuable mechanism that includes a part that is exposed for manual displacement, and extends downwardly in said actuation space from said part and inwardly in said actuation space to below said bottom for actuation of said electrical switch means.

10. An apparatus according to claim 9, in which said manually actuable mechanism includes a tension cord.

11. An apparatus according to claim 9, in which said manually actuable mechanism includes a pivot means that supports a lever having a first arm which extends upwardly to said part, and a second arm which extends inwardly to said switch means.

12. An apparatus according to claim 9, in which said vessel bottom has a raised central portion surrounded by a trough within said interior of said vessel; and in which said electrical device is an electrical immersion heater that extends through said raised central portion and has an electrically heatable portion which extends in said trough.

13. An apparatus according to claim 12, which includes a steam responsive mechanism disposed at an upper end of said actuation space and operatively associated with said part, with said vessel wall including passage means for connecting said interior and said actuation space to permit steam generated in said interior to be directed to said steam responsive mechanism.

14. An apparatus according to claim 12, in which said vessel is a molded plastic member; and which includes a metal heat shield that is clamped to said raised central portion by said heater, and is shaped in such a way that it extends into said trough to below said heatable portion.

15. An apparatus according to claim 9, in which said switch means is provided at least in part in said support apparatus to automatically interrupt said supply of electricity when said appliance is removed from said support apparatus.

16. An apparatus according to claim 9, in which said switch means and said electrical device are connected together to form an assembly that is secured to said bottom.

17. An apparatus according to claim 16, in which said support apparatus includes a power supply switch to automatically interrupt said supply of electricity when said appliance is removed from said support apparatus.

18. An electrical apparatus having electrical components centralized in a lower part of the apparatus for a lower center of gravity to improve stability as well as for protection against spilling of contents and concealment by a base skirt to assure attractive appearance, electrical safety and convenient operation for water boiling, for processing of a liquid, solid as well as a mixture thereof by heating, mixing or grinding, primarily concerning water boiling in an arrangement which physically incorporates a mechanism responsive to production of steam using substantially identical parts and manufacturing procedures with the only difference being with respect to cordless and cord-attached configurations comprising:
a vessel having a lower portion, an interior that is bounded by a bottom in said lower portion and a wall which extends upwardly from said bottom, and an actuation space that is disposed externally of said interior and extends inwardly to below said bottom;
an electrical device disposed in said lower portion and connectable to an electrical supply connection; and
control means for controlling said electrical device, said control means including: electrical switch means that communicates with said actuation space and is actuable from below said bottom to connect said electrical device to said electrical supply connection; and a non-electrical, manually actuable mechanism that includes a part that is exposed for manual displacement, and extends inwardly in said actuation space, below said bottom, for actuation of said electrical switch means, with the latter and said electrical device being connected together to form an assembly that is secured to said bottom.

19. An apparatus according to claim 18, in which said vessel bottom has a raised central portion surrounded by a trough within said interior of said vessel; and in which said electrical device is an electrical immersion heater that extends through said raised central portion and has an electrically heatable portion which extends in said trough.

20. An apparatus according to claim 19, in which said vessel is a molded plastic member; and which includes a metal heat shield that is clamped to said raised control portion by said heater, and is shaped in such a way that it extends into said trough to below said heatable portion.

21. An electrical apparatus having electrical components centralized in a lower part of the apparatus for a lower center of gravity to improve stability as well as for protection against spilling of contents and concealment by a base skirt to assure attractive appearance, electrical safety and convenient operation for water boiling, for processing of a liquid, solid as well as a mixture thereof by heating, mixing or grinding, primarily concerning water boiling in an arrangement which physically incorporates a mechanism responsive to production of steam using substantially identical parts and manufacturing procedures with the only difference being with respect to cordless and cord-attached configurations comprising:
    an appliance in the form of a vessel having a hollow base in which are disposed electrical connectors and an electrical device;
    a support apparatus for supporting said appliance, with said support apparatus having electrical connector means adapted to engage with said electrical connectors of said appliance, when the latter is supported on said support apparatus in a predetermined position, for supplying electrical power to said electrical device; and
    control means for controlling said electrical device, said control means including: electrical switch means associated with said electrical device for controlling same; and a manually actuable mechanism that includes a part that is exposed for manual displacement, and extends from said part and inwardly in said hollow base for actuation of said electrical switch means.

22. An apparatus according to claim 21, in which said electrical switch means is incorporated in said support apparatus and includes an actuating member that projects upwardly for actuation by said manually actuable mechanism.

23. An apparatus according to claim 21, in which said support apparatus is provided with load sensitive means that includes a platform to support said appliance, with said load sensitive means being adapted to control actuation of said electrical switch means in conformity with the degree of displacement of said platform.

24. An electrical apparatus comprising a vessel, for construction in cordless and cord-attached versions, and comprising electrical components including an electrical heating device and electrical switch means centralized in a lower part of the apparatus, for a lower center of gravity to improve stability as well as for protection against spilling of contents and concealment by a base skirt to assure attractive appearance, electrical safety and convenient operation for water boiling, wherein said vessel comprises a lower portion, an interior that is bounded by a bottom in said lower portion and a wall which extends upwardly from said bottom, and an actuation space that is disposed externally of said interior and extends upwardly at least partially along said wall, and inwardly to below said bottom; wherein said electrical heating device is disposed in said lower portion and supported by said bottom, said electrical device being connectable to a supply of electricity; and comprising control means for controlling said electrical device, said control means including: said electrical switch means that is in communication with said actuation space and is mechanically actuable from below said bottom for controlling communication of said electrical device with said supply of electricity; and a non-electrical, manually actuable mechanism that includes a part that is exposed for manual displacement, and extends downwardly in said actuation space from said part and inwardly in said actuation space to below said bottom for actuation of said electrical switch means.

25. An apparatus according to claim 24, in which said vessel bottom has a raised central portion surrounded by a trough within said interior of said vessel; and in which said electrical device is an electrical immersion heater that extends through said raised central portion and has an electrically heatable portion which extends in said trough.

26. An apparatus according to claim 25, in which said vessel is a molded plastic member; and which includes a metal heat shield that is clamped to said raised control portion by said heater, and is shaped in such a way that it extends into said trough to below said heatable portion.

27. An apparatus according to claim 26, wherein said electrical components have centralized dependent connector means provided with centralization of electrical components specifically for a cordless version with a base electrical supply stand.

28. An apparatus according to claim 26, wherein a captive socket means is provided inside said base skirt for protection of a cord-attached version.

* * * * *